(12) United States Patent
Watfa et al.

(10) Patent No.: US 9,661,564 B2
(45) Date of Patent: May 23, 2017

(54) METHOD AND APPARATUS FOR SELECTED INTERNET PROTOCOL TRAFFIC OFFLOAD

(75) Inventors: Mahmoud Watfa, Saint Leonard (CA); Ulises Olvera-Hernandez, Kirkland (CA); Behrouz Aghili, Commack, NY (US); Pascal M. Adjakple, Great Neck, NY (US); J. Patrick Tooher, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 154 days.

(21) Appl. No.: 12/987,644

(22) Filed: Jan. 10, 2011

(65) Prior Publication Data

US 2011/0170469 A1     Jul. 14, 2011

Related U.S. Application Data

(60) Provisional application No. 61/293,423, filed on Jan. 8, 2010, provisional application No. 61/304,199, filed on Feb. 12, 2010.

(51) Int. Cl.
*H04W 80/04* (2009.01)
*H04W 48/00* (2009.01)
(Continued)

(52) U.S. Cl.
CPC .............. *H04W 48/17* (2013.01); *H04W 4/06* (2013.01); *H04W 48/08* (2013.01); *H04W 48/16* (2013.01); *H04W 68/00* (2013.01); *H04W 76/026* (2013.01)

(58) Field of Classification Search
CPC ...... H04W 48/17; H04W 48/16; H04W 48/08
(Continued)

(56) References Cited

U.S. PATENT DOCUMENTS 8,304,492 B2   11/2012   Greminger et al.
8,412,157 B2   4/2013   Wang et al.
(Continued)

FOREIGN PATENT DOCUMENTS

EP   2 136 600    12/2009
JP   2009147640 A2   7/2009
(Continued)

OTHER PUBLICATIONS

3GPP TSG SA WG2 Meeting #76, TD S2-096598, Nov. 16, 2009, pp. 1 and 2.*

(Continued)

*Primary Examiner* — Andrew Lee
(74) *Attorney, Agent, or Firm* — Youngae Kim

(57) ABSTRACT

A method and apparatus of performing selective internet protocol (IP) selective offload (SIPTO) or local IP access (LIPA) is disclosed. A wireless transmit receive unit (WTRU) receives a broadcast message from a Node-B. Then the WTRU receives a message from the Node-B that SIPTO service, or LIPA service is available for that WTRU. The WTRU then communicates using the SIPTO or LIPA service. A method an apparatus for receiving a paging message for SIPTO or LIPA services is also disclosed. The paging message includes an indicator that indicates that the message is for SIPTO or LIPA communications. The indicator may be a temporary mobile subscriber identity (TMSI) assigned by the network specifically for SITPO or LIPA communications. The indicator may also be a single bit designated to indicate that a paging message is a for SIPTO or LIPA traffic.

11 Claims, 6 Drawing Sheets

(51) Int. Cl.
*H04W 4/06* (2009.01)
*H04W 48/08* (2009.01)
*H04W 48/16* (2009.01)
*H04W 68/00* (2009.01)
*H04W 76/02* (2009.01)

(58) Field of Classification Search
USPC ....... 370/331, 329, 332, 338, 310, 360, 352,
370/465, 466, 467; 455/436, 458, 411,
455/432.1, 432.2, 433, 434, 435.3, 437
See application file for complete search history.

(56) References Cited

U.S. PATENT DOCUMENTS

| | | | |
|---|---|---|---|
| 8,494,529 B2* | 7/2013 | Kim et al. | 455/438 |
| 2009/0239533 A1 | 9/2009 | Somasundaram et al. | |
| 2010/0267388 A1* | 10/2010 | Olsson | 455/436 |
| 2011/0038304 A1* | 2/2011 | Lin et al. | 370/328 |
| 2011/0075675 A1* | 3/2011 | Koodli et al. | 370/401 |
| 2011/0116469 A1* | 5/2011 | Bi | H04W 76/022 370/331 |
| 2011/0170517 A1* | 7/2011 | Bakker et al. | 370/331 |
| 2012/0039304 A1* | 2/2012 | Kim | H04W 28/08 370/332 |
| 2012/0151030 A1* | 6/2012 | Guttman | H04L 45/24 709/223 |
| 2012/0178416 A1* | 7/2012 | Miklos | H04L 29/12066 455/410 |

FOREIGN PATENT DOCUMENTS

| | | |
|---|---|---|
| JP | 2009253431 A2 | 10/2009 |
| JP | 2011-518471 | 6/2011 |
| WO | 2008054668 A2 | 5/2008 |
| WO | 2008/125729 | 10/2008 |
| WO | 2009132824 A2 | 11/2009 |
| WO | 2010/113528 | 10/2010 |
| WO | 2010/129931 | 11/2010 |

OTHER PUBLICATIONS

Huawei, "Selected IP Traffic Offload for UMTS at Iu-PS," 3GPP TSG SA WG2 Meeting #75, S2-096067 (Aug. 31-Sep. 4, 2009).
Panasonic, "Open issue for UE initiating LIPA/SIPTO in Solution 1," 3GPP TSG SA WG2 Meeting #76, S2-096598 (Nov. 16-20, 2009).
Qualcomm Europe, "Key aspects: P-GW/GGSN location principles for LIPA and SIPTO traffic,"3GPP TSG SA WG2 Meeting #75, S2-095088 (Aug. 28-Sep. 2, 2009).
Third Generation Partnership Project, "Technical Specification Group Core Network and Terminals; Non-Access-Stratum (NAS) Protocol for Evolved Packet Systems (EPS); Stage 3 (Release 8)," 3GPP TS 24.301 v8.4.0, Dec. 2009.
Third Generation Partnership Project, "Technical Specification Group Core Network and Terminals; Non-Access-Stratum (NAS) Protocol for Evolved Packet Systems (EPS); Stage 3 (Release 8)," 3GPP TS 24.301 v8.8.0, Dec. 2010.
Third Generation Partnership Project, "Technical Specification Group Core Network and Terminals; Non-Access-Stratum (NAS) Protocol for Evolved Packet Systems (EPS); Stage 3 (Release 9)," 3GPP TS 24.301 v9.1.0, Dec. 2009.
Third Generation Partnership Project, "Technical Specification Group Core Network and Terminals; Non-Access-Stratum (NAS) Protocol for Evolved Packet Systems (EPS); Stage 3 (Release 9)," 3GPP TS 24.301 v9.5.0, Dec. 2010.
Third Generation Partnership Project, "Technical Specification Group Core Network and Terminals; Non-Access-Stratum (NAS) Protocol for Evolved Packet Systems (EPS); Stage 3 (Release 10)," 3GPP TS 24.301 v10.1.0, Dec. 2010.

Third Generation Partnership Project, "Technical Specification Group Services and System Aspects; Local IP Access and Selected IP Traffic Offload (Release 10)," 3GPP 23.829 v0.3.1, Dec. 2009.
Third Generation Partnership Project, "Technical Specification Group Services and System Aspects; Local IP Access and Selected IP Traffic Offload (Release 10)," 3GPP 23.829 v1.3.0, Sep. 2010.
Third Generation Partnership Project, "Technical Specification Group Services and System Aspects; Service Aspects; Service Principles (Release 9)," 3GPP TS 22.101 v9.6.0, Dec. 2009.
Third Generation Partnership Project, "Technical Specification Group Services and System Aspects; Service Aspects; Service Principles (Release 9)," 3GPP TS 22.101 v9.8.0, Oct. 2010.
Third Generation Partnership Project, "Technical Specification Group Services and System Aspects; Service Aspects; Service Principles (Release 10)," 3GPP TS 22.101.v10.1.0, Dec. 2009.
Third Generation Partnership Project, "Technical Specification Group Services and System Aspects; Service Aspects; Service Principles (Release 10)," 3GPP TS 22.101 v10.5.0, Dec. 2010.
Third Generation Partnership Project, "Technical Specification Group Services and System Aspects; Service Aspects; Service Principles (Release 11)," 3GPP TS 22.101 v11.0.0, Oct. 2010.
Third Generation Partnership Project, "Technical Specification Group Services and System Aspects; Service Requirements for Home Node B (HNB) and Home eNode B (HeNB) (Release 9)," 3GPP TS 22.220 v9.3.0, Dec. 2009.
Third Generation Partnership Project, "Technical Specification Group Services and System Aspects; Service Requirments for Home Node B (HNB) and Home eNode B (HeNB) (Release 9)," 3GPP TS 22.220 v9.5.0, Oct. 2010.
Third Generation Partnership Project, "Technical Specification Group Services and System Aspects; Service Requirments for Home Node B (HNB) and Home eNode B (HeNB) (Release 10)," 3GPP TS 22.220 v10.5.0, Dec. 2010.
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.12.0 (Dec. 2010).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.7.0 (Dec. 2010).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.3.0 (Dec. 2009).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.2.0 (Dec. 2010).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.8.0 (Dec. 2009).
Third Generation Partnership Project, "Technical Specification Group Services and System Aspects; Local IP Access and Selected IP Traffic Offload; (Release 10)," 3GPP TR 23.829 V0.3.0 (Nov. 2009).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.5.0 (Mar. 2009).
Third Generation Partnership Project, "Technical Specification Group Core Network and Terminals; Non-Access-Stratum (NAS) Protocol for Evolved Packet Systems (EPS); Stage 3 (Release 10)," 3GPP TS 24.301 v10.1.0, Dec. 2010.

(56) References Cited

OTHER PUBLICATIONS

Third Generation Partnership Project, "Technical Specification Group Services and System Aspects; Service Aspects; Service Principles (Release 10)," 3GPP TS 22.101 v10.1.0, Dec. 2009.
Third Generation Partnership Project, "Technical Specification Group Services and System Aspects; Service Requirements for Home Node B (HNB) and Home eNode B (HeNB) (Release 9)," 3GPP TS 22.220 v9.5.9, Oct. 2010.
Third Generation Partnership Project, "Technical Specification Group Services and System Aspects; Service Requirements for Home Node B (HNB) and Home eNode B (HeNB) (Release 10)," 3GPP TS 22.220 v10.5.0, Dec. 2010.
Huawei, "Selected IP Traffic Offload for UMTS at Iu-PS," 3GPP TSG SA WG2 Meeting #75, S2-096067 (Aug. 31-Sep. 4, 2009).
Third Generation Partnership Project, "Technical Specification Group Core Network and Terminals; Non-Access-Stratum (NAS) Protocol for Evolved Packet System (EPS); Stage 3 (Release 8)," 3GPP TS 24.301 v8.4.0, Dec. 2009.
Third Generation Partnership Project, "Technical Specification Group Services and System Aspects; Service Requirements for Home Node B (HNB) and Home eNode B (HeNB) (Release 9)," 3GPP TS 22.220 v9.5.0, Oct. 2010.
Motorola, "Architectural Principles for UE to Support Local IP Access and Selected IP Traffic Offload," 3GPP TSG SA WG2 Meeting #75, S2-095219, Kyoto, Japan (Aug. 31-Sep. 4, 2009).
Motorola, "Solution for Local IP Access and Selected IP Traffic Offload Using Local PDN Connection," 3GPP TSG SA WG2 Meeting #75, S2-095220, Kyoto, Japan (Aug. 31-Sep. 4, 2009).
NEC, Triggering Local GW Relocation, 3GPP TSG SA WG2 Meeting #77, S2-100100, Shenzhen, China (Jan. 18-22, 2010).
Panasonic, "Open issue for UE initiating LIPA/SIPTO in Solution 1," 3GPP TSG SA WG2 Meeting #76, S2-096598, San Jose del Cabo, Mexico (Nov. 16-20, 2009).
Qualcomm Europe, "LIPA solution for H(e)NB using a local PDN connection," 3GPP TSG SA WG2 Meeting #75, S2-095089, Kyoto, Japan (Aug. 31-Sep. 4, 2009).
Samsung, "How to enable and disable LIPA/SIPTO," 3GPP TSG SA WG2 Meeting #77, S2-100949 (e-mail revision 9 of S2-100775), Shenzhen, China (Jan. 18-22, 2010).
ZTE, "To establish PDN connection by enhance ANDSF," 3GPP TSG SA WG2 Meeting #75, S2-095314, Kyoto, Japan (Aug. 31-Sep. 4, 2009).
Third Generation Partnership Project, " Technical Specification Group Core Network; Mobile radio interface layer 3 specification; Core Network Protocols; Stage 3 (Release 1999)," 3GPP TS 24.008 V3.20.0 (Dec. 2005).
Third Generation Partnership Project, " Technical Specification Group Core Network and Terminals; Mobile radio interface Layer 3 specification; Core network protocols; Stage 3 (Release 4)," 3GPP TS 24.008 V4.17.0 (Sep. 2007).
Third Generation Partnership Project, " Technical Specification Group Core Network and Terminals; Mobile radio interface Layer 3 specification; Core network protocols; Stage 3 (Release 5)," 3GPP TS 24.008 V5.16.0 (Jun. 2006).
Third Generation Partnership Project, " Technical Specification Group Core Network and Terminals; Mobile radio interface Layer 3 specification; Core network protocols; Stage 3 (Release 6)," 3GPP TS 24.008 V6.19.0 (Jun. 2008).
Third Generation Partnership Project, "Technical Specification Group Core Network and Terminals; Mobile radio interface Layer 3 specification; Core network protocols; Stage 3 (Release 6)," 3GPP TS 24.008 V6.20.0 (Mar. 2010).
Third Generation Partnership Project, "Technical Specification Group Core Network and Terminals; Mobile radio interface Layer 3 specification; Core network protocols; Stage 3 (Release 7)," 3GPP TS 24.008 V7.14.0 (Mar. 2009).
Third Generation Partnership Project, "Technical Specification Group Core Network and Terminals; Mobile radio interface Layer 3 specification; Core network protocols; Stage 3 (Release 7)," 3GPP TS 24.008 V7.15.0 (Mar. 2010).
Third Generation Partnership Project, "Technical Specification Group Core Network and Terminals; Mobile radio interface Layer 3 specification; Core network protocols; Stage 3 (Release 8)," 3GPP TS 24.008 V8.8.0 (Dec. 2009).
Third Generation Partnership Project, "Technical Specification Group Core Network and Terminals; Mobile radio interface Layer 3 specification; Core network protocols; Stage 3 (Release 8)," 3GPP TS 24.008 V8.12.0 (Dec. 2010).
Third Generation Partnership Project, "Technical Specification Group Core Network and Terminals; Mobile radio interface Layer 3 specification; Core network protocols; Stage 3 (Release 9)," 3GPP TS 24.008 V9.1.0 (Dec. 2009).
Third Generation Partnership Project, "Technical Specification Group Core Network and Terminals; Mobile radio interface Layer 3 specification; Core network protocols; Stage 3 (Release 9)," 3GPP TS 24.008 V9.5.0 (Dec. 2010).
Third Generation Partnership Project, "Technical Specification Group Core Network and Terminals; Mobile radio interface Layer 3 specification; Core network protocols; Stage 3 (Release 10)," 3GPP TS 24.008 V10.1.0 (Dec. 2010).
"3rd Generation Partnership Project; Technical Specification Group Services and System Aspects; Service requirements for Home NodeBs and Home eNodeBs (Release 10)", 3GPP TS 22.220 V10.1.0, Dec. 2009, 23 pages.
"Notification of Transmittal of the International Search Report and the Written Opinion of the International Search Authority, or the Declaration", PCT Application No. PCT/US2011/020637, May 24, 2011, 21 pages.
"Japanese Notice of Rejection", Japanese Application No. 2012-548199, Oct. 15, 2013, 3 pages.
"Japanese Notice of Rejection (English Translation)", Japanese Application No. 2012-548199, Oct. 15, 2013, 2 pages.
Panasonic, "Open issue for UE initiating LIPA/SIPTO in Solution 1", 3GPP TSG SA WG2 Meeting #76, S2-097234 (Revision of S2-096598); San Jose Del Cabo, Mexico, Nov. 16-20, 2009, 2 pages.

\* cited by examiner

METHOD AND APPARATUS FOR SELECTED INTERNET PROTOCOL TRAFFIC OFFLOAD

CROSS REFERENCE TO RELATED APPLICATIONS

This application claims the benefit of U.S. Provisional Application No. 61/293,423 filed on Jan. 8, 2010, and U.S. Provisional Application No. 61/304,199 filed on Feb. 12, 2010, the contents of which are hereby incorporated by reference herein.

BACKGROUND

Selected internet protocol (IP) traffic offload (SIPTO) is a method to offload traffic from a wireless communication system operator's core network to a defined IP network that is close to a point of attachment to the access point of a wireless transmit receive unit (WTRU). When reference is made to a core network with respect to the data plane, the nodes under consideration include the serving gateway (SGW) and the packet data network gateway (PDW) in, for example, a long term evolution (LTE) compliant system, or the serving general packet radio service (GPRS) support node (SGSN) and gateway GPRS support node (GGSN) in a universal mobile telephone system (UMTS) terrestrial radio access network (UTRAN), although the disclosure herein is not limited to any one network architecture or technology. The goal of SIPTO is to offload some of the IP traffic from traversing these nodes.

SIPTO may require that a WTRU may process both offloaded traffic and non-offloaded, or non-SIPTO, traffic that goes through the operators network. SIPTO may be used in, for example, a UTRAN, an evolved UTRAN (E-UTRAN) and a macro cell with a home eNodeB (HeNB), for example.

SUMMARY

A method and apparatus of performing selective internet protocol (IP) offload (SIPTO) or local IP access (LIPA) is disclosed. A wireless transmit receive unit (WTRU) receives a broadcast message from a Node-B. Then the WTRU receives a message from the Node-B that SIPTO service, or LIPA service is available for that WTRU. The WTRU then communicates using the SIPTO or LIPA service.

A method an apparatus for receiving a paging message for SIPTO or LIPA services is also disclosed. The paging message includes an indicator that indicates that the message is for SIPTO or LIPA communications. The indicator may be a temporary mobile subscriber identity (TMSI) assigned by the network specifically for SITPO or LIPA communications. The indicator may also be a single bit designated to indicate that a paging message is a for SIPTO or LIPA traffic.

BRIEF DESCRIPTION OF THE DRAWINGS

A more detailed understanding may be had from the following description, given by way of example in conjunction with the accompanying drawings wherein.

DETAILED DESCRIPTION

Figure 1A:
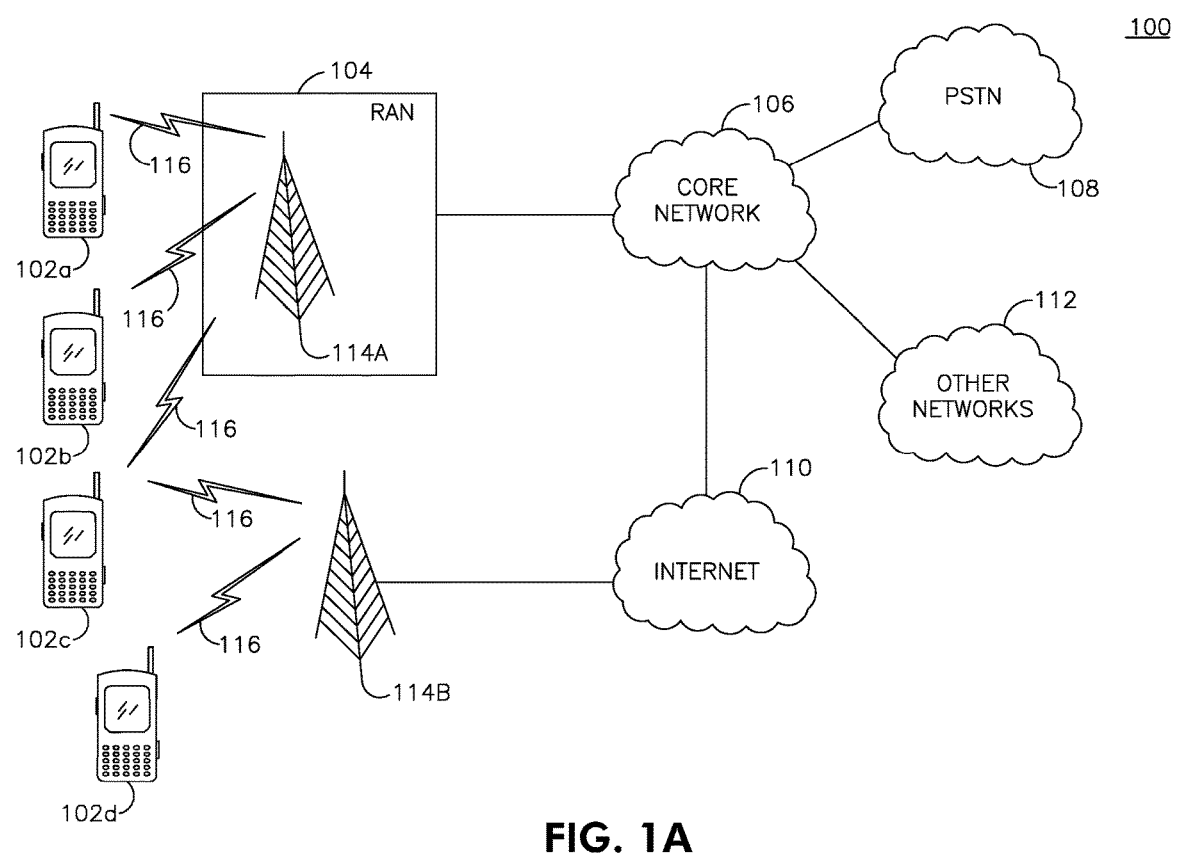
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, a Home Node B, a Home, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
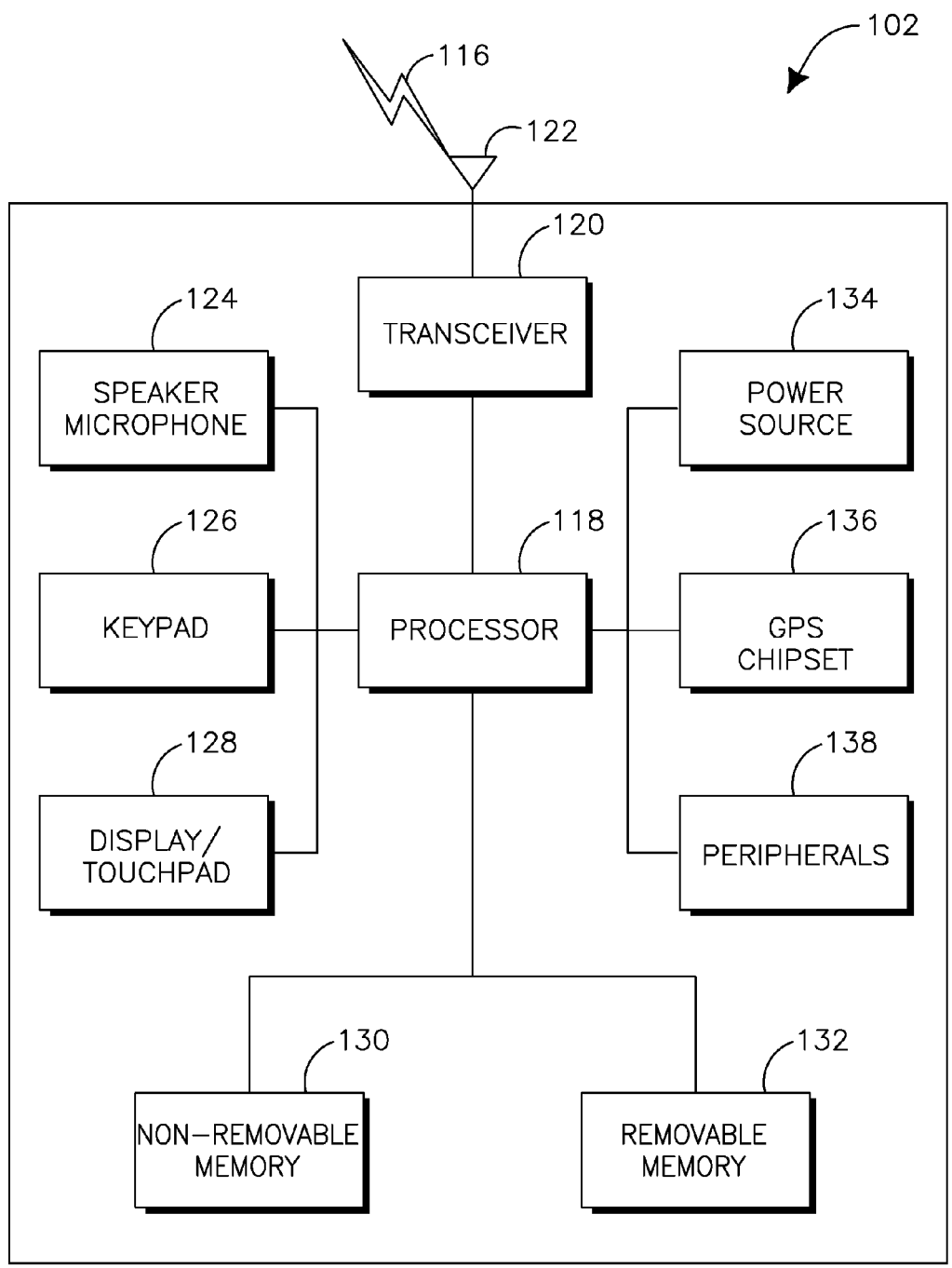
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
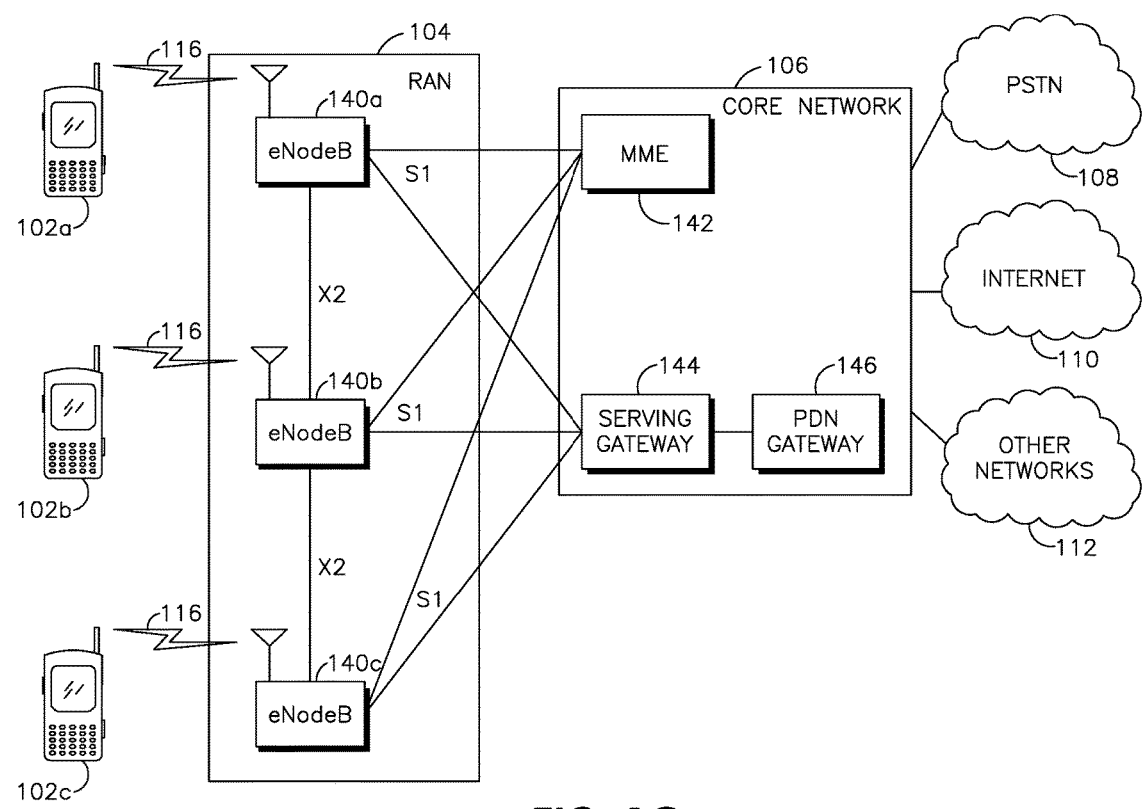
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the s 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
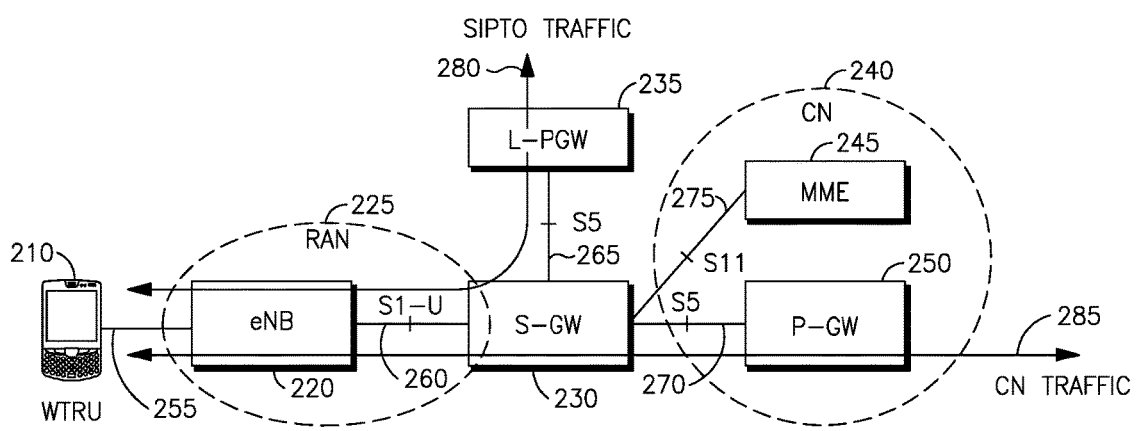
FIG. 2 is an example architecture of a wireless network configured to perform SIPTO.

FIG. 2 shows an example LTE system 200 configured to provide SIPTO services. The system includes a WTRU 210 in communication with an eNB 220 that is located in a radio access network (RAN) 225. The eNB 220 is also in communication with S-GW 230, which is also in communication with L-PGW 235 and a core network (CN) 240. The CN 240 includes an MME 245 and a P-GW 250.

The WTRU 210 communicates with the eNB 220 over a wireless air interface 255. The eNB 220 also communicates with the S-GW 230 over an S1-U interface 260. The S-GW 230 communicates with the L-PGW 235 over an S5 interface 265, and with the P-GW 250 over an S5 interface 270. The S-GW 230 also communicates with the MME 245 over an S11 interface 275. Two traffic streams are also shown, a SIPTO traffic stream 280 that is routed through the S-GW 230 to the L-PGW 265, and a CN traffic stream 285 that is routed through the S-GW 230 to the P-GW 250 in the CN 240.

The eNB 220 may also be a HeNB configured to perform SIPTO in a home network of the user of the WTRU 210. In that case, traffic may be offloaded locally to a user's home network. The home network may be an IP network that is connected to other devices such as a printer, a television, and a personal computer, for example. These nodes on the home network may be using private addressing.

Also the system 200 may be configured to provide Local IP Access (LIPA). While many of the features disclosed herein are described with regard to SIPTO, they may also be applied to LIPA and SIPTO systems for HeNBs. For example, SIPTO or LIPA may include single or multiple packet data network (PDN) connections, deployment behind network address translation (NAT), and the like.

Furthermore, for traffic going through the mobile operator's core network, the S-GW 230 user plane functions may be located within the CN 240. Also, mobility management signalling between a WTRU 210 and the network may be handled in the CN 240. Session management signalling, such as bearer setup, for LIPA or SIPTO traffic, and traffic going through the CN 240 may terminate in the CN 240. Also, reselection of a WTRU's offload point for SIPTO traffic that is geographically or topologically close to the WTRU 210 may be possible during idle mode mobility procedures.

The SIPTO system may include a local gateway that is close to a WTRU's point of attachment to the access network. The local gateway may perform IP traffic offload based on some policy or configuration, for example, based on the IP address destination. IP traffic may go through the local gateway rather than through the operator's core network via, for example, an S-GW and a P-GW or via an SGSN and a GGSN (not pictured).

Depending on the network technology, a local break point or local gateway may be in the HeNB subsystem or in a radio network controller (RNC). Also, the SGSN may be responsible for both control and user plane in some networks, while the user and control planes are taken care of by a mobility management entity (MME) and an SGW in others.

A local gateway, such as the L-PGW 235, may have certain functionalities of a PDW/GGSN. For example, the local gateway may have the following functionalities IP address allocation, direct tunneling with the RAN 225 in connected mode, per WTRU policy based packet filtering, of rate policing/shaping. In order to perform SIPTO transfers to a network, such as a local network or Intranet, for example, a proper PDN connection may be required. A WTRU may set an access point name (APN) to a specific value when requesting a PDN connection or when requesting the establishment of a packet data protocol (PDP) context.

Figure 3:
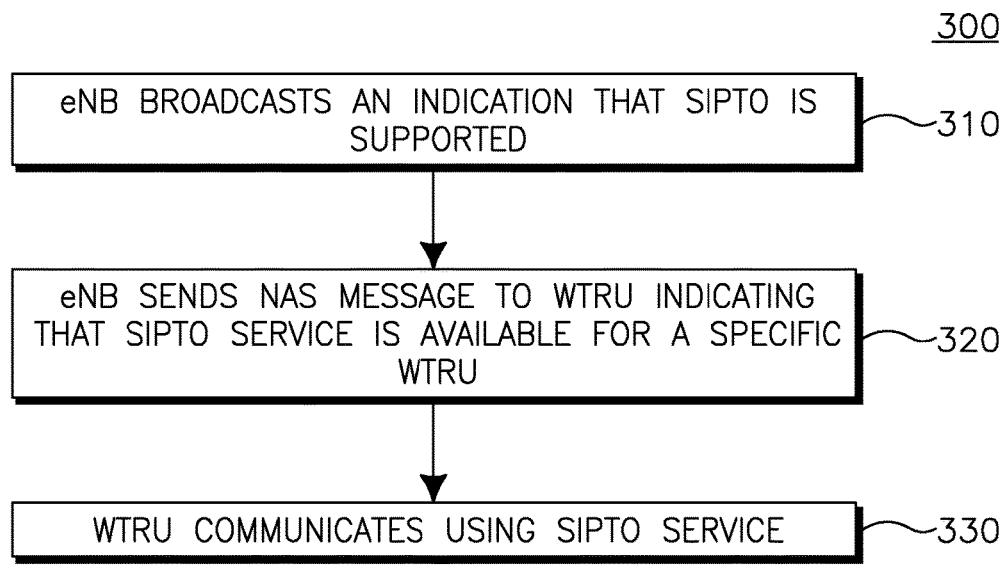
FIG. 3 is an example flow diagram of procedure for indicating support of SIPTO services.

FIG. 3 is a flow diagram showing an example trigger procedure 300 for the WTRU to communicate using SIPTO or LIPA services. First, the eNode B broadcasts an indication of support of SIPTO or LIPA to indicate that such a service is available in a network for some WTRUs, at 310. The eNode B may then send a NAS message to a WTRU indicating that SIPTO or LIPA service is allowed for that WTRU, at 320. The WTRU may then communicate using the SIPTO or LIPA service, at 330.

It should be noted that the service indication of support for SIPTO or LIPA service may be broadcasted on a per cell basis, or for another area such as a routing area or tracking area. The indication may be broadcast in a system information message, for example. Further, the cell may be a CSG cell in the case of LIPA. The cell may also provide an indication of the availability of SIPTO or LIPA services in a NAS message such as an Attach Accept, TAU Accept, or RAU Accept for example.

The WTRU may also provide an indication of SIPTO or LIPA capability to the network. This may be useful whether the WTRU supports SIPTO or LIPA for macro cells, for HeNBs, or both. A WTRU and/or the network may also provide an indication of support for SIPTO or LIPA in an LTE system only, UTRAN only, or both, or also any other combination of systems including non-3GPP access.

The availability of SIPTO or LIPA service, the level of support, the type of system, and the like may also be provided to the WTRU using an access network discovery and selection function (ANDSF). This may be provided as a policy that helps the WTRU change or use certain access technologies.

The indicators described herein may be used relative to a target system or cell. For example, when the WTRU is performing inter-system change or packet switched (PS) handover from one network to another, such as from LTE to UTRAN, the indication of SIPTO or LIPA support in the target system may be included in a mobility message such as the MobilityFromEUTRACommand. The indication may also be transmitted upon release of a radio resource control (RRC) connection with redirection information. The WTRU may use the indication to trigger a PDP context activation to a certain GGSN or PDN connection to a specific PDW for inter-system change from UTRAN to E-UTRAN, for example. The WTRU may also be provided with a default access point name (APN) or it may derive the APN based on its location. Alternatively, the APN may be left undetermined or set to a random or unknown value. The network may choose the appropriate gateway based on some policies. Indicators may also be used in an intra-system handover. The indications may be forwarded to the upper layers, such as the NAS, in order to initiate any signaling that is needed for SIPTO or LIPA services.

An indication about the support of SIPTO or LIPA for CSG cells may be used. The WTRU may maintain the indication for all or some of its CSG IDs in, for example, a white list, maintained by the access stratum, or a radio resource control (RRC) entity. Alternatively, the WTRU may maintain the indication for all or some of its CSG IDs in the USIM, the allowed operator list maintained by the Non access stratum (NAS), or the operator controlled list maintained by NAS.

The WTRU may be informed if the local gateway that serves the WTRU for SIPTO or LIPA is standalone or collocated with a CSG cell. The WTRU may deactivate its PDN connection(s) either locally or by signaling the network (MME 245 or SGSN) when the WTRU leaves its previous cell where SIPTO or LIPA was provided. Moreover, the deactivation may avoid paging the WTRU for SIPTO or LIPA traffic when the WTRU is in idle mode.

Figure 4:
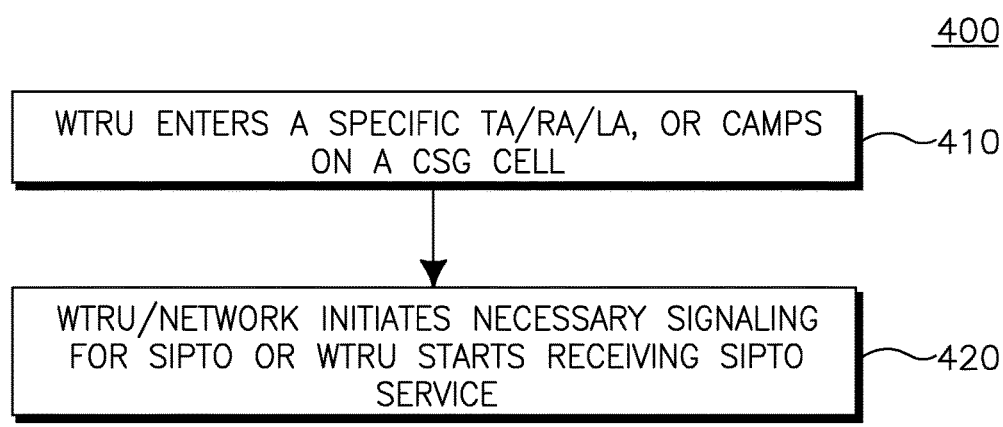
FIG. 4 is an example flow diagram of a procedure for triggering delivery of SIPTO service.

FIG. 4 shows an example procedure 400 for triggering delivery of SIPTO service. The procedure begins when the WTRU enters a specific area, such as routing area (RA), tracking area (TA) or Local Area (LA) or camps on a CSG cell, at 410. Then the WTRU or network initiates the signaling for SIPTO, or the WTRU starts receiving SIPTO service, at 420.

The initiation of SIPTO or LIPA service occurs when the offload of traffic occurs. The WTRU may be unaware of the offload process. SIPTO or LIPA initiation may also occur when the signaling that might be needed in order to offload selected traffic occurs, for example, when a new PDN connection is needed.

The WTRU may trigger SIPTO or LIPA services when the WTRU enters a specific tracking area identity (TAI) or routing area identity (RAI), or a specific service area. Alternatively, the WTRU may use an indication it receives in a TAU Accept or a RAU Accept message in order to take specific action, such as the establishment of a new PDN connection or activation of a new PDP context, for example.

A trigger may occur when the WTRU camps on, or goes to, a CSG cell. The WTRU may trigger a PDN connection even if it is unaware of whether SIPTO or LIPA is supported on a CSG cell. Otherwise, the WTRU may use the indications as set forth herein, for each CSG identity, to determine triggering of any necessary signaling for SIPTO, such as establishment of a new PDN connection or PDP context activation, for example. Alternatively, this may be done upon manual selection of CSG or macro cells.

A trigger may occur when a WTRU receives indications from the network that SIPTO or LIPA service is available using, for example, dedicated signaling such as an EPS mobility management (EMM) information message or other NAS or radio resource control (RRC) messages.

If the establishment of a new PDN connection, activation of a new PDP context or modification of any bearer/context is required for SIPTO or LIPA, the network may also initiate the procedures. For example, a PDN connection may be initiated by a WTRU. The network may initiate a PDN connection towards the WTRU when the network decides to deliver SIPTO or LIPA services to the WTRU. This may be achieved using a session management message. Alternatively, the network may directly send a message, such as an Activate Default EPS Bearer Context to the WTRU. A similar message may be sent in a UTRAN for PDP context activation. The network may include the APN of the gateway that is performing traffic offload for the WTRU. Moreover, the network may add an EPS session management (ESM) cause to indicate that the connection is for SIPTO or LIPA service.

The WTRU may use any of the indicators disclosed herein to display to the user of the WTRU any relevant information that is related to SIPTO or LIPA. The user may use the information for many purposes, such as starting specific services, local file transfer, and the like.

The WTRU may provide preferences regarding traffic, such as preferences as to which traffic should be offloaded. Other triggers may be related to quality of service (QoS). Any degradation in received QoS may trigger the start of a SIPTO procedure so that traffic is diverted away from the CN.

At each connection establishment, the RAN may provide at least one IP address to the network nodes. The network nodes may then choose a local gateway for SIPTO or LIPA. However, at the point of connection establishment, the RAN may not know what data type, that is, SIPTO or non-SIPTO, will be sent by the WTRU. Several gateways may be made ready as potential paths or routes for SIPTO or LIPA traffic. Alternatively, a HeNB gateway (GW) may receive at least the first user plane packet before it may suggest a routing path or a local gateway for SIPTO or LIPA. Alternatively, the choice of path or gateway may be made for each bearer context or PDP context. An HeNB GW, or any other node that needs to take an action for SIPTO or LIPA service provision, such as the RAN, may decide whether packets should not go through the core network based on mappings to certain bearer or contexts which are known to be SIPTO or LIPA affected. Specific bearers may be known to carry SIPTO or LIPA traffic or non-SIPTO traffic.

The same triggers defined in relation to starting SIPTO or LIPA service may also be used to stop the delivery of SIPTO or LIPA services. The network may stop the offload of selected traffic, possibly without the WTRU being aware of the stopping of the service. The network may also stop the exchange of signaling between the WTRU and the network, such as a request to disconnect from a PDN or to deactivate a PDP context. The signaling may be triggered by either the network or the WTRU. In addition, the WTRU and network may initiate an end to SITPO or LIPA service delivery based on an expiration of a timer. For example, when no user data is exchanged for a specific configurable or default time, the timer may expire and SIPTO or LIPA service may be closed.

Figure 5:
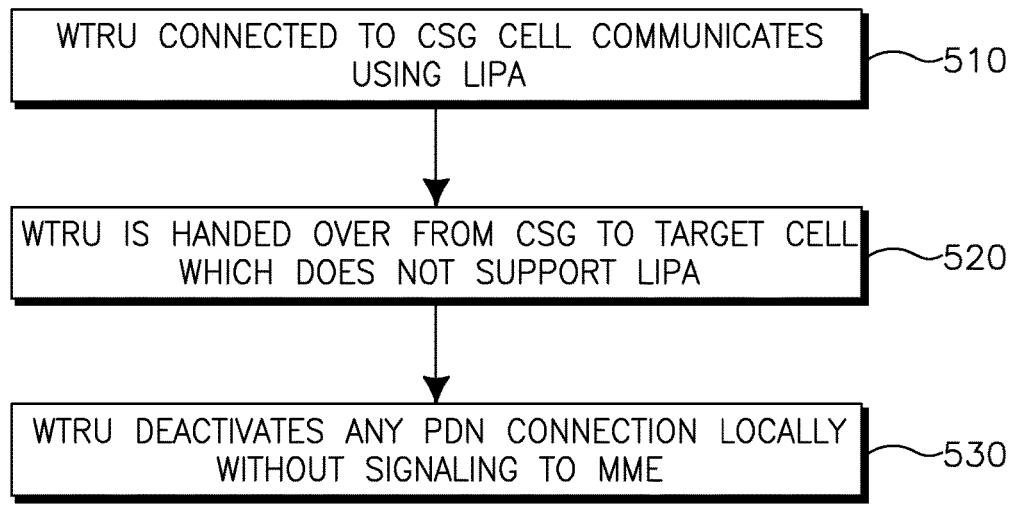
FIG. 5 is an example flow diagram of a procedure for stopping delivery of SIPTO services.

FIG. 5 shows an example procedure 500 for the WTRU to stop LIPA services if the WTRU's subscription on a CSG expires. The WTRU is connected to a CSG and communicates using LIPA services, at 510. The WTRU is handed over from a CSG from which LIPA service was provided, to a target cell on which LIPA service is not provided, at 520. Then, the WTRU may deactivate any PDN connection locally without signaling to the MME, at 530. Alternatively, the deactivated bearers may be signaled in other messages, such as TAU or RAU requests and responses, for example.

The WTRU or a user of the WTRU may provide preferences about what traffic should not be offloaded. Other triggers are possible and may be related to QoS. For example, any degradation in received QoS may cause a stop of SIPTO or LIPA and traffic may be diverted via the core network.

Figure 6:
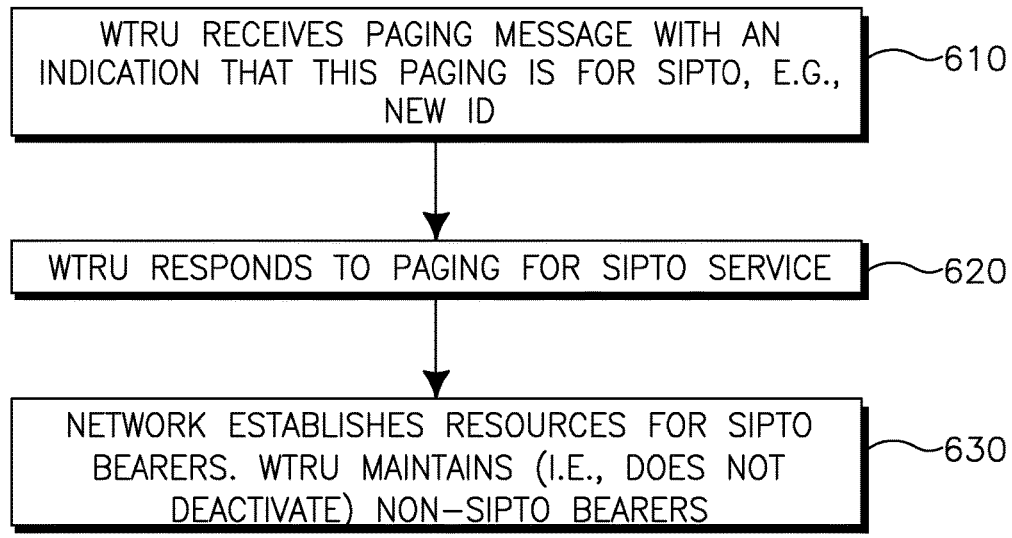
FIG. 6 is an example flow diagram of a paging procedure using SIPTO.

FIG. 6 shows an example procedure 600 for performing paging in a SIPTO enabled system. The procedure starts when the WTRU receives a paging message including an indication that the paging message is for SIPTO and a CSG ID, at 610. Then the WTRU responds to the paging for SIPTO service message, at 620. Then the network establishes resources for SITPO bearers and the WTRU maintains non-SIPTO bearers, at 630.

The network may indicate to the WTRU that a paging message, sent via RRC signaling, is due to SIPTO or LIPA traffic. A specific SIPTO or LIPA identifier (ID) may be used for the page to differentiate the SIPTO or LIPA page from other pages. The ID may be similar to a temporary mobile subscriber identity (TMSI) such as an S-TMSI or a P-TMSI, and may be assigned by the network when the SIPTO or LIPA service is initiated. The network may allocate this ID in a message, such as an NAS message. The NAS message may be, for example, an Attach Accept, TAU Accept, RAU Accept, and the like. Additionally, a new core network domain identifier in the RRC paging message may be used to indicate that the paging is for SIPTO or LIPA. Also, a bit may be used to indicate that a paging message is for SIPTO or LIPA traffic.

The WTRU may respond to the paging for SIPTO or LIPA by sending a message, such as the NAS Service Request message, for example, or another message for similar purposes. An establishment cause may be used when a WTRU is requesting an RRC connection or NAS signaling connection for SIPTO or LIPA traffic.

If the WTRU requests an RRC connection, a NAS signaling connection, or a mobile originating or terminating SIPTO or LIPA traffic and sends a message, such as a Service Request message or other message with a similar purpose, the radio and S1 bearers may not be established for enhanced packet service (EPS) bearer contexts that are used for traffic that goes through the CN. In addition, the WTRU may not deactivate the EPS bearer contexts for which no radio or S1 bearers were established, and maintains the existing non-SIPTO bearers. The WTRU and the network may use other signaling, such as an RRC message (RRC-ConnectionReconfiguration) for example, to establish radio and S1 bearers for CN traffic when it is available. The WTRU may also trigger establishment of radio and S1 bearers by sending a message, such as an NAS or an RRC message.

In an embodiment, MME or SGSN functionality may be located in a local gateway. The local gateway may host a part of the total MME responsibilities that may be in the CN. Some of the local MME functions may include paging for SIPTO traffic and termination of a signaling point for SIPTO or LIPA and both mobility and session management signaling, for example. The local MME may communicate with the CN's MME in order to update certain WTRU contexts in the network, such as establishment of new bearers for SIPTO or LIPA traffic and disconnecting of PDN connections, for example.

The local gateway or any other local functionality, such as the traffic offload point function, for example, may maintain some mobility management contexts for the WTRUs such as an S-TMSI, M-TMSI, or P-TMSI and an international mobile subscriber identity (IMSI), routing area identifier (RAI) and tracking area identifier (TAT), for example. The local functionality may be useful where the local functionality may contact the WTRU via paging to provide information to nodes such as the RNC or RRC, for example.

The WTRU may also deactivate idle mode signaling reduction (ISR) when LIPA traffic on a home or enterprise network is started or when SIPTO traffic on a home cell, enterprise CSG cells or macro cell is started. The deactivation may avoid the need to page the WTRU if the WTRU reselects between two systems and if the LIPA/SIPTO traffic cannot be routed to the target system.

In addition, the WTRU may initiate a tracking or routing area update procedure to inform the MME or SGSN, respectively, that the WTRU has left its previous cell where LIPA or SIPTO was activated. This may require a new update type. The network and the WTRU may deactivate all related contexts and IP addresses. Alternatively, the network and the WTRU may maintain all related contexts and IP addresses. If the related contexts and IP address are maintained, the WTRU may not be paged for LIPA/SIPTO if the traffic cannot be routed to the WTRU's current location. However, if the SIPTO or LIPA traffic may be routed across the RAN, the WTRU may not deactivate ISR when SIPTO or LIPA is initiated. The WTRU may decide on activation or deactivation based on a configuration or on indications from the network.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:
1. A method of operating a wireless transmit/receive unit (WTRU), the method comprising:
  receiving, at the WTRU, a broadcast system information (SI) message of a Long Term Evolution (LTE) system from an evolved Node-B (eNB) indicating that traffic off-load (TO) is supported;
  after receiving the broadcast SI message, receiving, at the WTRU, a non-access stratum (NAS) message from the eNB, wherein the NAS message indicates that a TO service is available for the WTRU;
  initiating an off-load of traffic in response to at least receiving the NAS message; and
  communicating using the TO service while maintaining at least one bearer with the eNB.
2. The method of claim 1 wherein the eNB is a Home evolved Node B (HeNB).
3. The method of claim 1 wherein the NAS message is an Attach Accept message.
4. The method of claim 1 wherein the NAS message is a Tracking area update Accept message.
5. A wireless transmit/receive unit (WTRU) comprising:
  a receiver configured to receive a broadcast system information (SI) message of a Long Term Evolution (LTE) system from an evolved Node-B (eNB) indicating that traffic off-load (TO) is supported B;
  the receiver further configured to, after receiving the broadcast SI message, receive a non-access stratum (NAS) message from the eNB, wherein the NAS message indicates that a TO service is available for the WTRU;
  a processor configured to initiate an off-load of traffic in response to at least the received NAS message; and the processor further configured to communicate using the TO service while maintaining at least one bearer with the eNB.

6. The WTRU of claim 5 wherein the NAS message is an Attach Accept message.

7. The WTRU of claim 5 wherein the NAS message is a Tracking area update Accept message.

8. The method of claim 1 wherein the TO service is received through non-3GPP access.

9. The WTRU of claim 5 wherein the TO service is received through non-3GPP access.

10. The method of claim 1 wherein receiving the NAS message from the eNB includes receiving the NAS message while the WTRU is camping on the eNB.

11. The WTRU of claim 5 wherein the receiver is configured to receive the NAS message while the WTRU is camping on the eNB.

* * * * *

UNITED STATES PATENT AND TRADEMARK OFFICE
CERTIFICATE OF CORRECTION

PATENT NO. : 9,661,564 B2
APPLICATION NO. : 12/987644
DATED : May 23, 2017
INVENTOR(S) : Mahmoud Watfa et al.

It is certified that error appears in the above-identified patent and that said Letters Patent is hereby corrected as shown below:

On the Title Page

Line 8 of Abstract section, "A method an apparatus" should read --A method and apparatus--;

Line 13 of Abstract section, "SITPO" should read --SIPTO--;

Line 15 of Abstract section, "is a for" should read --is for--;

Page 3, reference "Qualcomm Europe, "LIPA solution for H(e)NB using a local PDN connection," 3GPP TSG SA WG2 Meeting #75, S2-095089, Kyoto, Japan (Aug. 31-Sep. 4, 2009)" should read --Qualcomm Europe, "LIPA solution for H(e)NB using a local PDN connection," 3GPP TSG SA WG2 Meeting #75, S2-095089, Kyoto, Japan (Aug. 28 - Sep. 2, 2009)--; and In the Claims Column 9 Claim 5, Line 60, "is supported B;" should read --is supported;--.

Signed and Sealed this
Fifth Day of September, 2017

Joseph Matal
*Performing the Functions and Duties of the
Under Secretary of Commerce for Intellectual Property and
Director of the United States Patent and Trademark Office*